US012671253B2

(12) United States Patent
Reddy et al.

(10) Patent No.: US 12,671,253 B2
(45) Date of Patent: Jun. 30, 2026

(54) STRUCTURE FOR COMPUTATIONALLY EFFICIENT OPTIMIZATION FOR REAL TIME MICROGRID DISPATCH

(71) Applicant: Caterpillar Inc., Peoria, IL (US)

(72) Inventors: Suresh Baddam Reddy, Peoria, IL (US); Kevin J. Sergott, Dunlap, IL (US); Leo Roger Edward Shead, Peterborough (GB); Gavin Williams, Stamford (GB); Yanchai Zhang, Dunlap, IL (US); Ranjay Singh, Kanpur (IN)

(73) Assignee: Caterpillar Inc., Peoria, IL (US)

( * ) Notice: Subject to any disclaimer, the term of this patent is extended or adjusted under 35 U.S.C. 154(b) by 386 days.

(21) Appl. No.: 18/538,567

(22) Filed: Dec. 13, 2023

(65) Prior Publication Data

US 2025/0202235 A1 Jun. 19, 2025

(51) Int. Cl.
H02J 3/007 (2026.01)
H02J 3/38 (2006.01)

(52) U.S. Cl.
CPC .............. H02J 3/0075 (2020.01); H02J 3/38 (2013.01)

(58) Field of Classification Search
CPC .................................. H02J 3/0075; H02J 3/38
See application file for complete search history.

(56) References Cited

U.S. PATENT DOCUMENTS 9,367,108 B2 6/2016 Asghari et al.
9,438,041 B2 9/2016 Roy et al.

| | | | |
|---|---|---|---|
| 10,516,267 | B2 | 12/2019 | Yoo et al. |
| 12,536,601 | B2 * | 1/2026 | Cella .................... G05B 19/042 |
| 2016/0211664 | A1 | 7/2016 | Subbotin et al. |
| 2018/0088545 | A1 * | 3/2018 | Fuchs .................... G05B 15/02 |
| 2023/0059990 | A1 | 2/2023 | Reddy et al. |
| 2023/0060100 | A1 | 2/2023 | Reddy et al. |
| 2025/0118965 | A1 * | 4/2025 | Reddy ....................... H02J 3/28 |
| 2025/0125630 | A1 * | 4/2025 | Reddy ..................... H02J 3/381 |
| 2026/0028041 | A1 * | 1/2026 | Heo .................... B60W 60/001 |

FOREIGN PATENT DOCUMENTS

| | | | | |
|---|---|---|---|---|
| CN | 112270433 | | 1/2021 | |
| EP | 2973932 | | 1/2016 | |
| EP | 4513700 | A2 * | 2/2025 | ........ H02J 13/00002 |

* cited by examiner

*Primary Examiner* — Hussein Elchanti
(74) *Attorney, Agent, or Firm* — Schwegman

(57) ABSTRACT

A microgrid controller microgrid controller of a microgrid system includes processing circuitry configured to calculate real time power demand on the microgrid system; identify candidate energy assets of the microgrid system to activate according to the calculated real time power demand; dispatch candidate energy assets according to lower unit power cost when the candidate energy assets have unit power cost that does not vary with overlapping power distribution among multiple energy assets regardless of whether the unit power cost varies with time; dispatch candidate energy assets according to an a-priori determined optimization of power distribution when the candidate energy assets have unit power cost that varies with overlapping power distribution and does not vary with time; and dispatch candidate energy assets according to real time optimization of power distribution when the candidate energy assets have unit power cost that varies with overlapping power distribution and varies with time.

20 Claims, 9 Drawing Sheets

Figure 2:
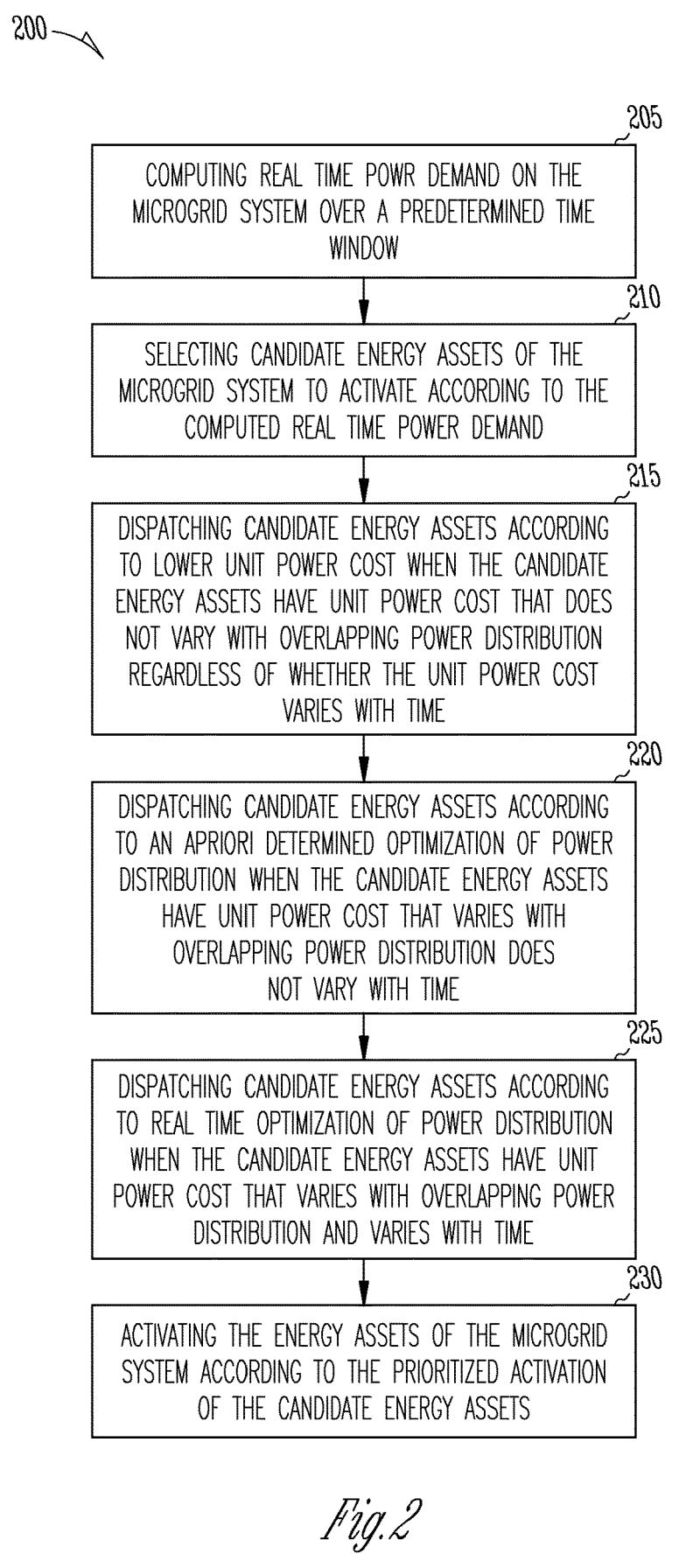

200

205

COMPUTING REAL TIME POWR DEMAND ON THE MICROGRID SYSTEM OVER A PREDETERMINED TIME WINDOW

210

SELECTING CANDIDATE ENERGY ASSETS OF THE MICROGRID SYSTEM TO ACTIVATE ACCORDING TO THE COMPUTED REAL TIME POWER DEMAND

215

DISPATCHING CANDIDATE ENERGY ASSETS ACCORDING TO LOWER UNIT POWER COST WHEN THE CANDIDATE ENERGY ASSETS HAVE UNIT POWER COST THAT DOES NOT VARY WITH OVERLAPPING POWER DISTRIBUTION REGARDLESS OF WHETHER THE UNIT POWER COST VARIES WITH TIME

220

DISPATCHING CANDIDATE ENERGY ASSETS ACCORDING TO AN APRIORI DETERMINED OPTIMIZATION OF POWER DISTRIBUTION WHEN THE CANDIDATE ENERGY ASSETS HAVE UNIT POWER COST THAT VARIES WITH OVERLAPPING POWER DISTRIBUTION DOES NOT VARY WITH TIME

225

DISPATCHING CANDIDATE ENERGY ASSETS ACCORDING TO REAL TIME OPTIMIZATION OF POWER DISTRIBUTION WHEN THE CANDIDATE ENERGY ASSETS HAVE UNIT POWER COST THAT VARIES WITH OVERLAPPING POWER DISTRIBUTION AND VARIES WITH TIME

230

ACTIVATING THE ENERGY ASSETS OF THE MICROGRID SYSTEM ACCORDING TO THE PRIORITIZED ACTIVATION OF THE CANDIDATE ENERGY ASSETS

Figure 4A:
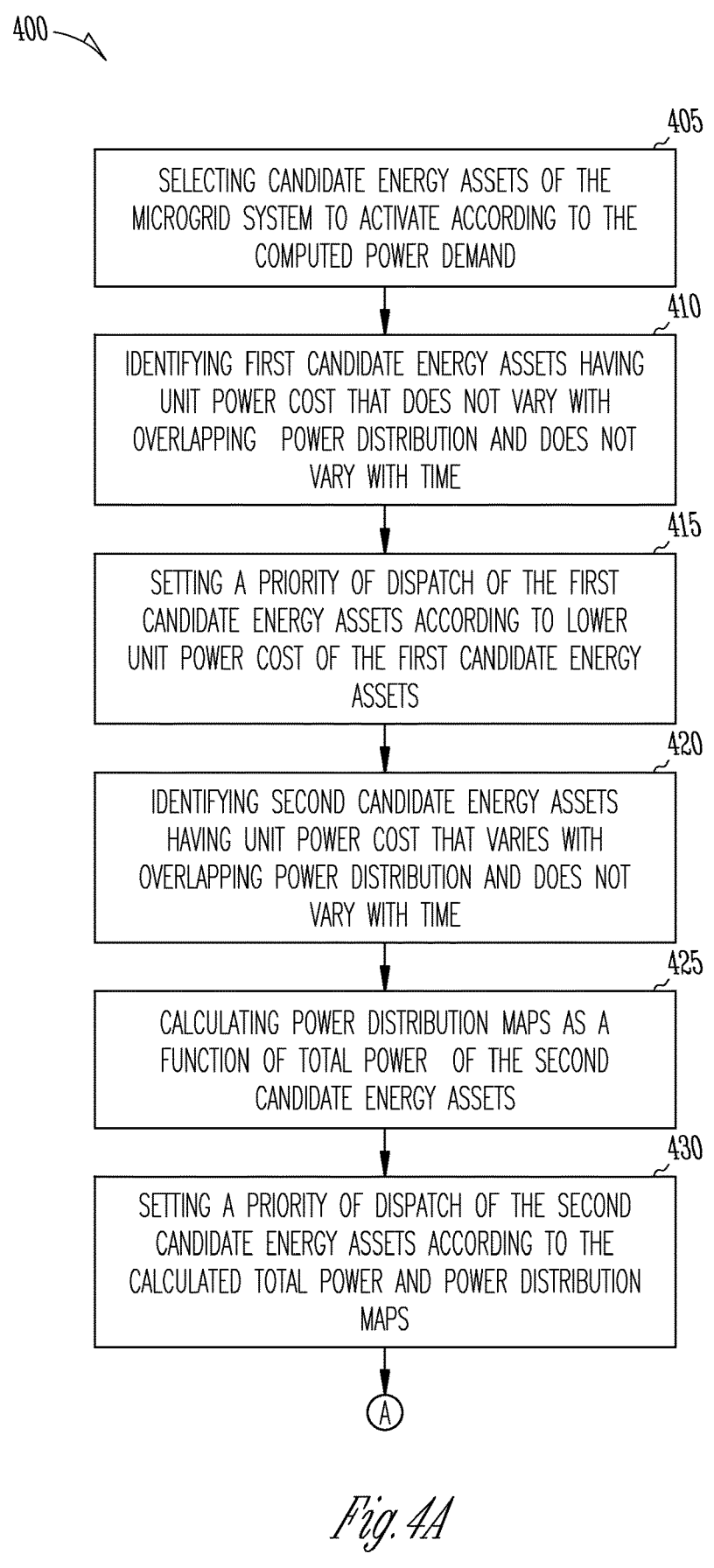

```
                                                    405
┌─────────────────────────────────────────────┐
│        SELECTING CANDIDATE ENERGY ASSETS OF THE       │
│    MICROGRID SYSTEM TO ACTIVATE ACCORDING TO THE      │
│             COMPUTED POWER DEMAND                      │
└─────────────────────────────────────────────┘
                        │
                        ▼                            410
┌─────────────────────────────────────────────┐
│    IDENTIFYING FIRST CANDIDATE ENERGY ASSETS HAVING   │
│      UNIT POWER COST THAT DOES NOT VARY WITH          │
│    OVERLAPPING  POWER DISTRIBUTION AND DOES NOT       │
│                 VARY WITH TIME                        │
└─────────────────────────────────────────────┘
                        │
                        ▼                            415
┌─────────────────────────────────────────────┐
│      SETTING A PRIORITY OF DISPATCH OF THE FIRST     │
│    CANDIDATE ENERGY ASSETS ACCORDING TO LOWER        │
│    UNIT POWER COST OF THE FIRST CANDIDATE ENERGY     │
│                     ASSETS                           │
└─────────────────────────────────────────────┘
                        │
                        ▼                            420
┌─────────────────────────────────────────────┐
│      IDENTIFYING SECOND CANDIDATE ENERGY ASSETS      │
│         HAVING UNIT POWER COST THAT VARIES WITH      │
│    OVERLAPPING POWER DISTRIBUTION AND DOES NOT       │
│                 VARY WITH TIME                        │
└─────────────────────────────────────────────┘
                        │
                        ▼                            425
┌─────────────────────────────────────────────┐
│       CALCULATING POWER DISTRIBUTION MAPS AS A       │
│       FUNCTION OF TOTAL POWER  OF THE SECOND         │
│             CANDIDATE ENERGY ASSETS                  │
└─────────────────────────────────────────────┘
                        │
                        ▼                            430
┌─────────────────────────────────────────────┐
│    SETTING A PRIORITY OF DISPATCH OF THE SECOND      │
│     CANDIDATE ENERGY ASSETS ACCORDING TO THE        │
│    CALCULATED TOTAL POWER AND POWER DISTRIBUTION     │
│                      MAPS                            │
└─────────────────────────────────────────────┘
                        │
                        ▼
                       (A)
```

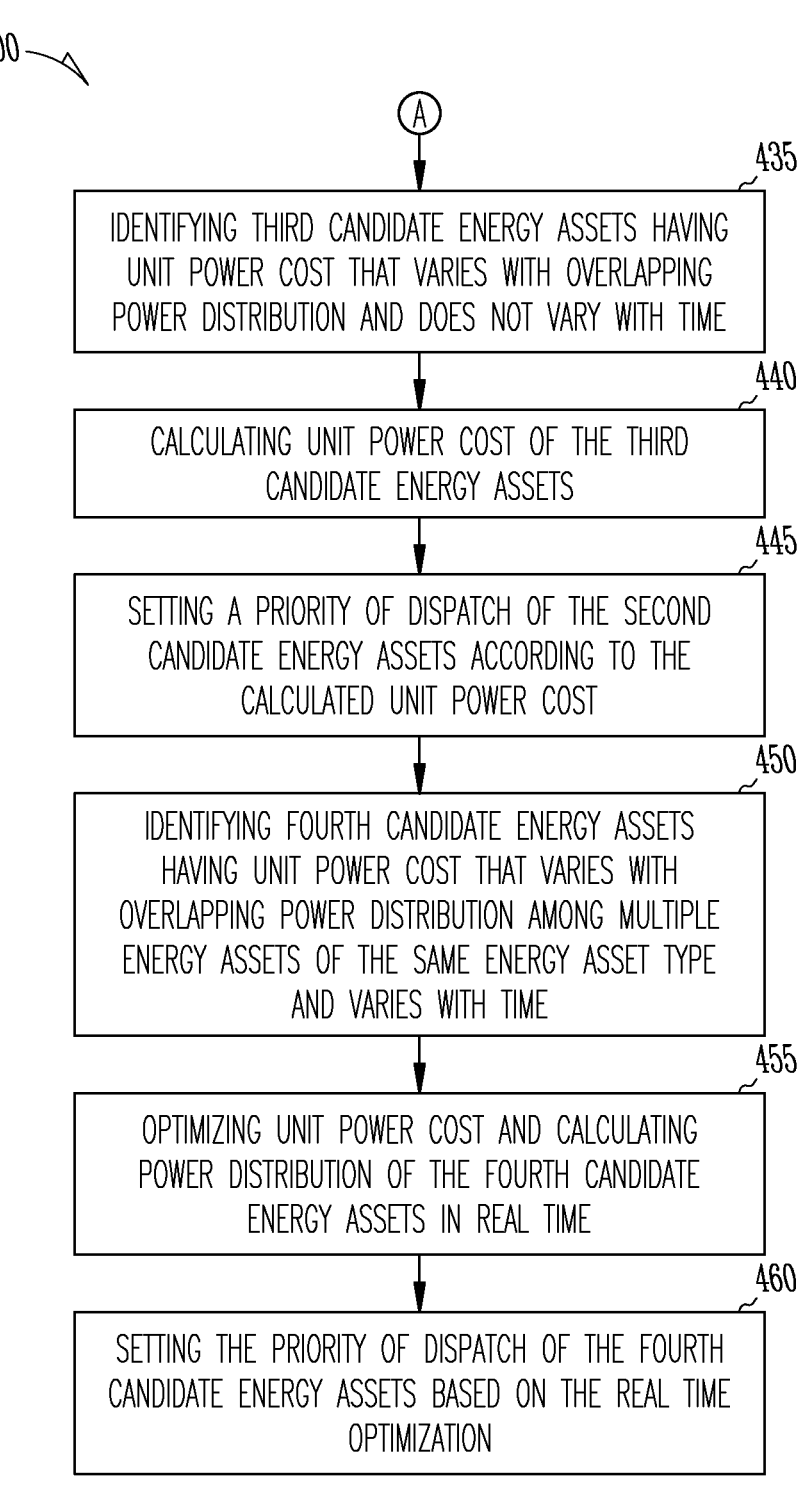

(A)

435

IDENTIFYING THIRD CANDIDATE ENERGY ASSETS HAVING
UNIT POWER COST THAT VARIES WITH OVERLAPPING
POWER DISTRIBUTION AND DOES NOT VARY WITH TIME

440

CALCULATING UNIT POWER COST OF THE THIRD
CANDIDATE ENERGY ASSETS

445

SETTING A PRIORITY OF DISPATCH OF THE SECOND
CANDIDATE ENERGY ASSETS ACCORDING TO THE
CALCULATED UNIT POWER COST

450

IDENTIFYING FOURTH CANDIDATE ENERGY ASSETS
HAVING UNIT POWER COST THAT VARIES WITH
OVERLAPPING POWER DISTRIBUTION AMONG MULTIPLE
ENERGY ASSETS OF THE SAME ENERGY ASSET TYPE
AND VARIES WITH TIME

455

OPTIMIZING UNIT POWER COST AND CALCULATING
POWER DISTRIBUTION OF THE FOURTH CANDIDATE
ENERGY ASSETS IN REAL TIME

460

SETTING THE PRIORITY OF DISPATCH OF THE FOURTH
CANDIDATE ENERGY ASSETS BASED ON THE REAL TIME
OPTIMIZATION

*Fig. 4B*

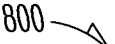
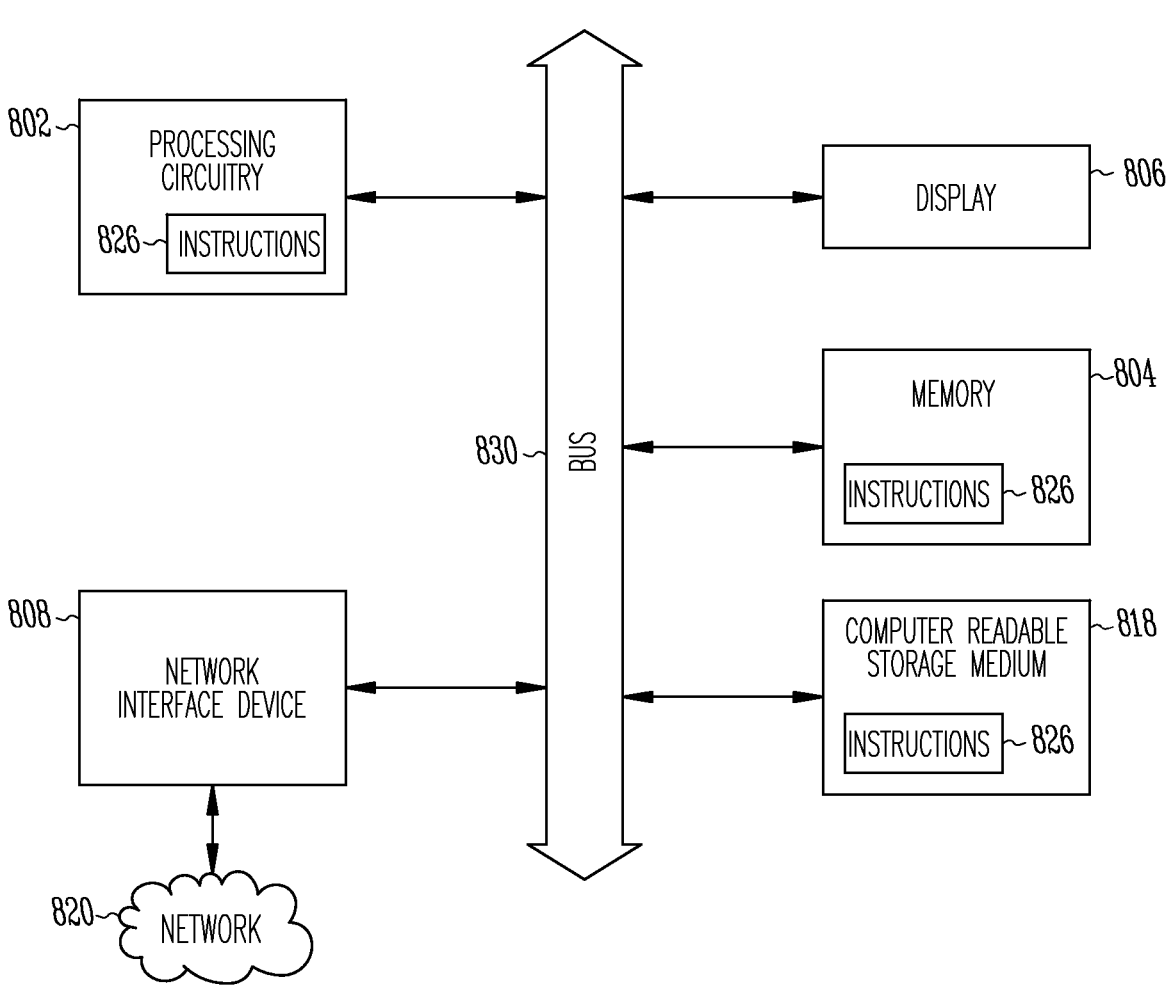
*Fig.8*

STRUCTURE FOR COMPUTATIONALLY EFFICIENT OPTIMIZATION FOR REAL TIME MICROGRID DISPATCH

TECHNICAL FIELD

This document relates to an energy microgrid that includes diverse types of energy assets.

BACKGROUND

A microgrid can use energy produced by different types of energy assets, such as generator sets (or gensets), battery energy storage systems (ESSs), photovoltaic sources (e.g., solar panels), wind turbines, hydro-electric power, pumped hydro-electric, fuel cells, hydrogen production and storage, etc., to provide power to the load or loads of the microgrid. It is desirable to control the microgrid to provide reliable power with objectives to minimize operating cost and emissions, maximize use of renewable energy sources, or optimizing a mix of these objectives. Many microgrid control systems use rule-based algorithms that are computationally efficient, but do not truly perform real time optimization. True real time optimization algorithms become computationally intensive, as the number of assets is beyond a small manageable number, due to "curse of dimensionality," i.e., as the dimensions increase, the search space for optimization increases exponentially, irrespective of the type of optimization method (e.g., mixed integer programming, equivalent consumption minimization, Pontryagin Minimum Principle, Machine Learning, etc.). This results in uncertainty of convergence of optimization, and/or unduly slows updates from the optimization for real time dispatch compared to changes in load of the microgrid and defeats the optimization purpose.

SUMMARY OF THE INVENTION

Operating a microgrid system can include dispatching of components or assets of the system. Dispatching can include activating the asset or adjusting the amount of power drawn from the asset. Instead of optimization of the microgrid system in a single step that is potentially computationally inefficient, a structured approach is taken to minimize computational burden: (i) segregate first candidate assets/groups that have no overlap in relative unit power cost (i.e. cost per unit power) irrespective of power and time (e.g., Photovoltaics operating cost always cheaper than gensets) and accordingly assign distinct relative priority between the assets/asset groups and stored for use in real time dispatch, (ii) identify second candidate assets whose unit power cost does not change with time, and the power distribution map among them can be mapped ahead of time, via a priori optimization, and stored for use during real time dispatch, (iii) identify third candidate assets whose unit power cost varies with time, but evaluation of real time cost function maps show no overlap irrespective of power distribution, and accordingly assign distinct relative priority between the assets/asset groups and use accordingly for real time dispatch, (iv) identify all remaining fourth candidate having unit power cost that is time varying, and real time evaluation of cost maps, and these require real time optimization computation for dispatch decisions.

The first two candidate assessments can be done a-priori without the microgrid operating in real time, while the last two candidates are dealt with during real time dispatch. For real time dispatch, those clearly identified a-priori as highest priority based on first candidate assessment are dispatched first (till their constraints such as desired max are met), compared to lower priority ones; power distribution among second priority candidates is done using a-priori maps; those identified in real time as higher priority based on third candidate assessment are dispatched ahead of lower priority ones; power distribution among fourth candidate assets is decided via real time optimization algorithm. Additionally, constraint of at least one grid forming capable asset being online, ensuring reserve beyond load, redundancy/resiliency requirements for reliable power are accommodated in the dispatch.

An example microgrid controller of a microgrid system includes processing circuitry configured to calculate real time power demand on the microgrid system; identify candidate energy assets of the microgrid system to activate according to the calculated real time power demand; dispatch candidate energy assets according to lower unit power cost when the candidate energy assets have unit power cost that does not vary with overlapping power distribution among multiple energy assets regardless of whether the unit power cost varies with time; dispatch candidate energy assets according to an a-priori determined optimization of power distribution when the candidate energy assets have unit power cost that varies with overlapping power distribution and does not vary with time; and dispatch candidate energy assets according to real time optimization of power distribution when the candidate energy assets have unit power cost that varies with overlapping power distribution and varies with time.

An example method of controlling a microgrid system includes computing, by the microgrid system, real time power demand on the microgrid system; selecting candidate energy assets of the microgrid system to activate according to the computed real time power demand; dispatching candidate energy assets according to lower unit power cost when the candidate energy assets have unit power cost that does not vary with overlapping power distribution among multiple energy assets regardless of whether the unit power cost varies with time; dispatching candidate energy assets according to an a-priori determined optimization of power distribution when the candidate energy assets have unit power cost that varies with the overlapping power distribution and does not vary with time; and dispatching candidate energy assets according to real time optimization of power distribution when the candidate energy assets have unit power cost that varies with the overlapping power distribution and varies with time.

An example microgrid system includes a microgrid controller and multiple energy assets of different energy asset types that provide energy to the microgrid. The microgrid controller includes processing circuitry configured to determine system load information; calculate real time power demand on the microgrid system according to the system load information; identify candidate energy assets of the microgrid system to activate according to the calculated real time power demand; send a command to dispatch candidate energy assets according to an a-priori determined prioritization when the candidate energy assets have unit power cost that does not vary with overlapping power distribution among multiple energy assets regardless of whether the unit power cost varies with time; send a command to dispatch candidate energy assets according to an a-priori determined optimization of power distribution when the candidate energy assets have unit power cost that varies with the overlapping power distribution and does not vary with time; and send a command to dispatch candidate energy assets according to real time optimization of power distribution when the candidate energy assets have unit power cost that varies with the overlapping power distribution and varies with time.

BRIEF DESCRIPTION OF THE DRAWINGS

FIG. 2 is a flow diagram of a method of controlling a microgrid system in accordance with this disclosure.

FIGS. 4A-4B show a flow diagram of an example of a method of prioritizing activation of the energy assets of a microgrid system in accordance with this disclosure.

FIG. 8 is a block diagram of an example computing device in accordance with this disclosure.

DETAILED DESCRIPTION

Examples according to this disclosure are directed to methods and systems that improve efficiency of controlling a microgrid system.

Figure 1:
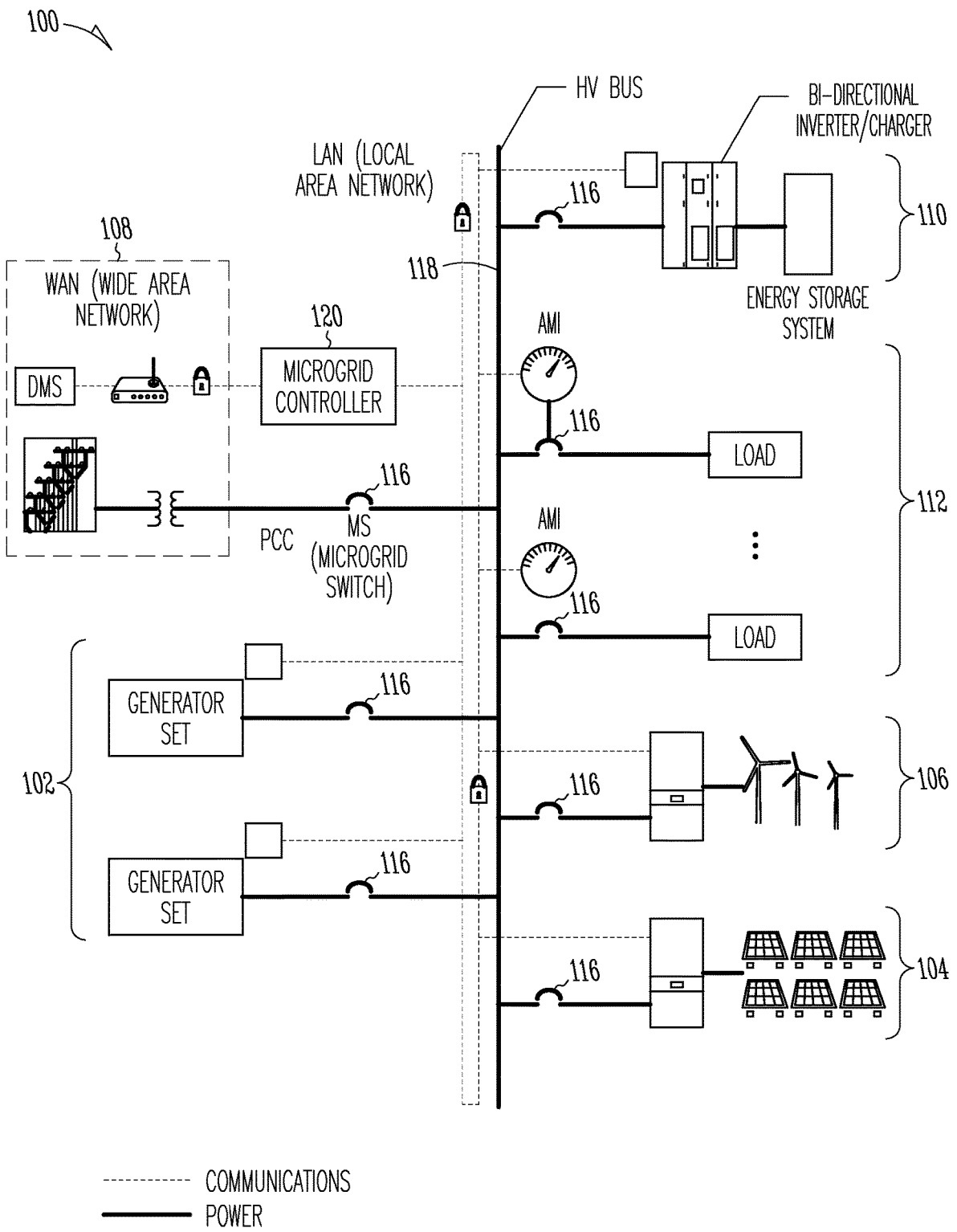
FIG. 1 illustrates an example microgrid system in accordance with this disclosure.

FIG. 1 is an illustration of portions of an example of a microgrid system 100. The microgrid system 100 includes multiple energy assets of multiple energy asset types connected to a high voltage bus 118 (HV Bus) through microgrid switches 116. The example of FIG. 1 shows groups of energy assets that include fueled assets such as gensets 102, and renewable energy assets such as photovoltaics 104 and wind turbines 106. The gensets 102 can be diesel fueled, gas reciprocating, gas turbines, hydrogen reciprocating, hydrogen turbines, blended fuel gensets, etc. The microgrid system 100 may include a connection to a utility grid 108.

The microgrid system 100 also includes one or more energy storage systems 110 (ESSs). An ESS 110 can include battery systems, hydrogen storage systems with electrolyzer, pumped hydro-electric systems, etc. An ESS 110 of the microgrid can be used to store energy excess energy created by energy assets or to store energy from the utility grid 108 during times when grid energy is lower cost. There can be multiple loads 112 on the microgrid system 100. For example, if the microgrid system 100 is powering a mining site, the loads 112 can include chargers for battery powered work machines or the loads 112 can include tethered/trolleyed work machines.

The microgrid system 100 includes a microgrid controller 120. The microgrid controller 120 includes processing circuitry that includes one or more processors (e.g., microprocessors, digital signal processors (DSP), application specific integrated circuits (ASICs), a programmable gate arrays (PGAs), or equivalent discrete or integrated logic circuitry). The microgrid controller 120 can include memory to store instructions performable by the processing circuitry. The instructions may be software or firmware instructions and the instructions configure the processing circuitry to perform the functions described for the processing circuitry.

The microgrid controller 120 performs supervisory functions of the microgrid system 100 such as dispatching the energy assets in real time based on real time power demand on the microgrid system 100. The microgrid controller 120 can dispatch an energy asset by sending an activation command that activates the energy asset and a command that directs power from the energy asset to a destination. For an ESS asset, the command may be a power request that may be a charge request or a discharge request. For a utility grid, the command may be a request to import power or export power, as permissible. The microgrid controller 120 may dispatch energy assets of the same type as a group of assets, or the microgrid controller may dispatch energy assets individually within a group at a subgroup level.

For real time dispatch of energy assets by the microgrid controller 120 there are several objective functions and constraints to consider when operating the microgrid system 100, such as providing reliable power while minimizing cost. The cost function for optimization, for example, may include minimizing operating cost, minimizing carbon dioxide emissions, maximizing renewables penetration, or a mix of these. The operating costs include direct energy costs (e.g., fuel and utility prices), asset maintenance costs, and assets degradation costs. There may also be costs associated with constraints on the system to enhance reliability of providing power (e.g., having an extra operating energy asset online for reliability that is not required to meet the load and reserve requirements), and enhance resiliency in the system (e.g., ensuring at least two grid forming capable assets are online so that a single asset failure does not cause a system shutdown).

A complex microgrid system can include many groups of energy assets of different types that provide power to many loads. For complex microgrid systems, the optimization algorithms may not converge to a solution fast enough to react to real time changes in the system. To meet the objectives and constraints for the microgrid system 100, the microgrid controller 120 should implement control for the system that is computationally efficient to be executable on a real time basis (e.g., within a few seconds) while still providing optimized dispatch of the energy assets.

FIG. 2 is a flow diagram of a method 200 of controlling a microgrid system that includes multiple types of energy assets (e.g., the microgrid system 100 of FIG. 1). The method 200 reduces the complexity of the energy asset optimization problem by the microgrid controller 120 quickly reducing the optimization portion to a few key variables that benefit the microgrid system through optimization, while other variables are identified that can be quickly handled at system set up or quickly calculated even during real time operation of the microgrid system.

At block 205, the microgrid controller 120 computes an estimate of the real time power demand on the microgrid system. The microgrid controller 120 may determine real time load information (e.g., load data) regarding one or more loads on the system to directly determine the power demand on the system. If the microgrid system is providing power to a mining site, the microgrid controller 120 may estimate the power demand based on one or more of amounts of material to be moved, the number of work machines to be powered, and the type of work machines to be powered. In some examples, the microgrid controller 120 determines the real time power demand indirectly using measurements of power draw from the energy assets.

At block 210, the microgrid controller 120 selects candidate energy assets to activate according to the computed real time power demand. The candidate energy assets may be identified according to their availability to provide energy to the microgrid system. For example, a renewable energy asset may be unavailable due to current weather conditions, or the utility grid may be unavailable at the job site.

At block 215, the microgrid controller 120 prioritizes dispatch of the candidate energy assets. The prioritization is based on the power cost functions of the candidate energy assets. The power cost function of an energy asset accounts for the costs associated with operating the energy asset. An example of a cost function is $$C(t) = C_{ENERGY} + C_{DEGR} + C_{MAINT} + C_{STARTSTOP},$$

where $C_{ENERGY}$ is the energy cost to operate the energy asset, $C_{DEGR}$ is the degradation cost of operating the energy asset, $C_{MAINT}$ is the maintenance cost of operating the energy asset, and $C_{STARTSTOP}$ is the excess start and stop cost associated with a higher frequency of starting and stopping operation of the energy asset.

For example, if the energy asset is a genset, the $C_{ENERGY}$ can include the cost of fuel for the genset, $C_{MAINT}$ is the maintenance cost for the genset based on the running hours of the genset, and the $C_{STARTSTOP}$ is the excess maintenance for excess starting and stopping frequency for gensets within a group of gensets operated as the energy asset. In another example, if the energy asset is an ESS, $C_{ENERGY}$ can include the grid energy cost to charge the ESS, and $C_{DEGR}$ can include the cost based on calendar and cyclic aging of the ESS. In some examples, the power cost functions can account for the efficiency of the energy asset or the per unit energy consumption of the energy asset, which is the inverse of efficiency of the asset. In some examples, the power cost function can include an emission cost $C_{EMISSIONS}$ if the microgrid system is operating in a jurisdiction where the government imposes a cost on emissions produced by the energy asset. The overall cost may include non-economic costs, such as emissions, renewable penetrations, etc.

The microgrid controller 120 gives higher priority to dispatching energy assets having a lower power cost (e.g., lower unit power cost) than dispatching energy assets having a higher power cost. The microgrid controller 120 may use a considerable amount of processing resources to optimize use of every energy asset of the microgrid. To reduce the processing resources needed to prioritize the energy assets, the microgrid controller also accounts for how the power cost function of the energy assets can vary. The power cost functions of some energy assets may vary with time. For example, the energy cost $C_{ENERGY}$ of an energy asset that uses energy from the utility grid may have a higher power cost during times of peak demand on the utility grid. The power cost functions of some energy assets may vary with overlapping power distributions among a group of the energy assets.

Figure 3:
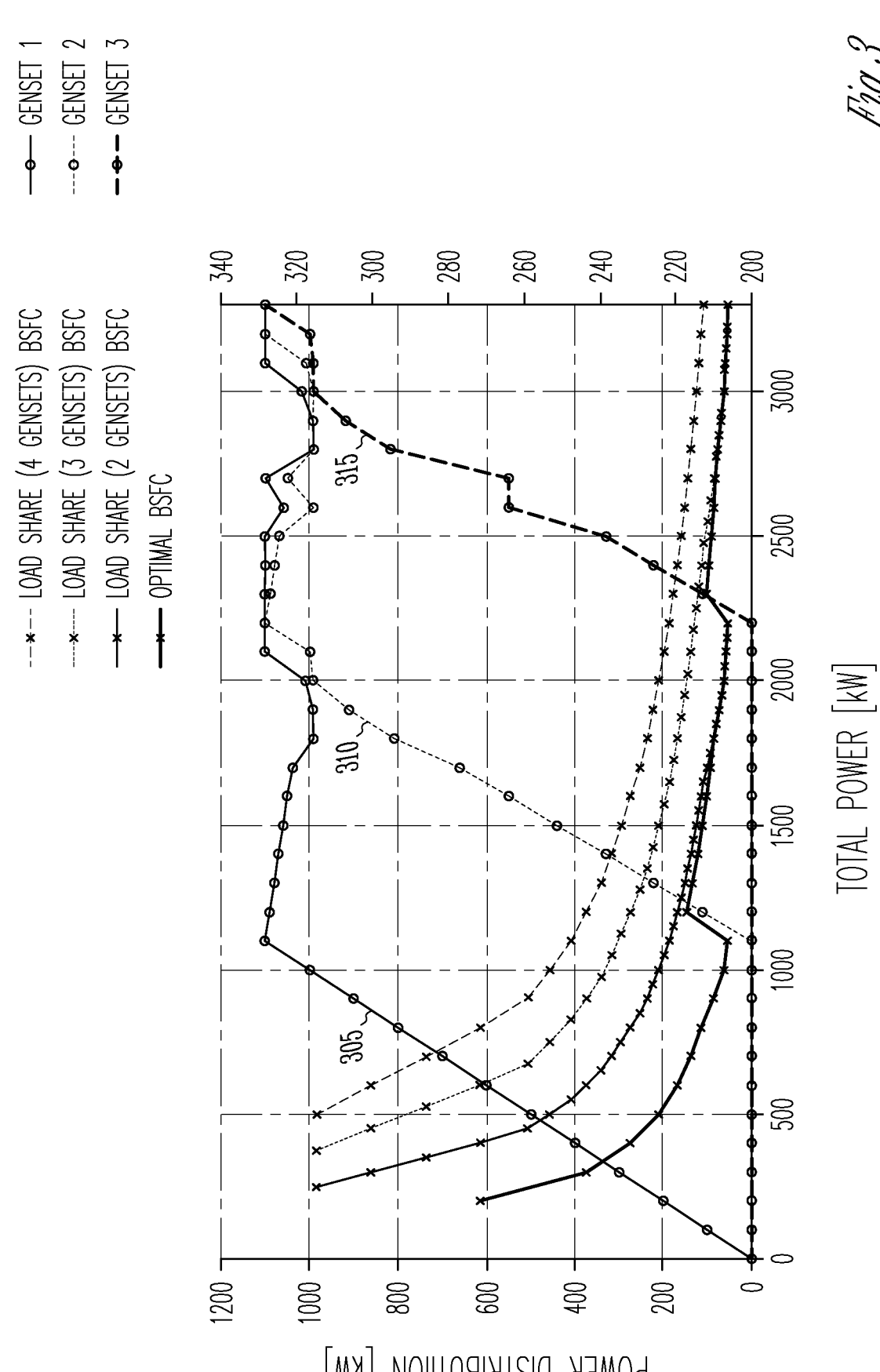
FIG. 3 is a graph of power distribution of operating three generator sets as a group in accordance with this disclosure.

FIG. 3 is a graph of power distribution of operating three gensets as a group. The graph includes overlapping power distribution of the three gensets as they are started up in succession to increase the total power output. Waveform 305 shows the power output from a first genset, waveform 310 shows the power output from a second genset, and waveform 310 shows the power output from a third genset. The graph also shows the optimal brake specific fuel consumption (BSFC) waveform 320 as the gensets are activated. FIG. 3 shows that the cost of operating the gensets varies with different amount of overlap of the power distribution of the gensets. For example, below 1000 kilowatts the graph shows that only using one genset of the group has lower fuel consumption and lower energy cost. Around 1200 kW, the energy cost increases when the second genset is started but begins to decrease as the total power output is increased.

Around 2300 kW, the energy cost increases when the third genset is started and decreases as the total power output is increased. There is also the excess start and stop cost $C_{STARTSTOP}$ associated with higher frequency of starting and stopping the gensets. Thus, the power cost function of operating the group of gensets varies with the amount of overlapping power distribution among the gensets of the group. The graph in FIG. 3 can be viewed as a power distribution map for the group of gensets to map cost to the overlapping power distribution of the gensets. If the overlapping power distribution does not change with time, the power distribution map can be computed a-priori offline before the gensets are dispatched and the microgrid controller 120 can reference the power distribution map to determine the power cost (e.g., unit power cost) of the group of gensets.

The microgrid controller 120 may use different algorithms to determine the priority of using a candidate energy asset based on whether the power cost function of the energy asset varies and how it varies. Returning to FIG. 2 at block 220, the microgrid controller 120 may determine priority of dispatch of an energy asset according to lower power cost (e.g., using a rule-based prioritization algorithm) if the power cost function for the energy asset does not vary with either time or overlapping power distribution, or if the power cost function varies only in time and not overlapping power distribution. At block 225, if the power cost function of the energy asset varies with overlapping power distribution and does not vary in time, the microgrid controller 120 may dispatch the energy asset according to an algorithm determined a-priori, before the energy asset is brought online to the grid, to optimize power distribution. At block 230, if the power cost function varies in both time and overlapping power distribution, the microgrid controller 120 performs a real time optimization algorithm to determine priority of dispatch of the energy asset. This reduces processing time in the prioritization of all energy assets but those energy assets that vary in time and overlapping power distribution. This reserves the most processing power for determining the dispatching of those energy assets that the microgrid benefits the most from optimization. At block 230, the microgrid controller dispatches the energy assets in real time according to the priority of dispatch determined a-priori and in real time.

FIGS. 4A-4B show a flow diagram of an example of a method 400 of prioritizing activation of the energy assets of a microgrid system. The method 400 is performed using a microgrid controller of the microgrid system (e.g., microgrid controller 120 of FIG. 1). The prioritization may be for individual energy assets of the microgrid system or groups of energy assets of the same type.

At block 405, the candidate energy assets for prioritization are selected for prioritization by the microgrid controller. The prioritization may be for a predetermined time window (e.g., the next few minutes) and the candidate energy assets may be based on real time power demand estimated by the microgrid controller.

Figure 5:
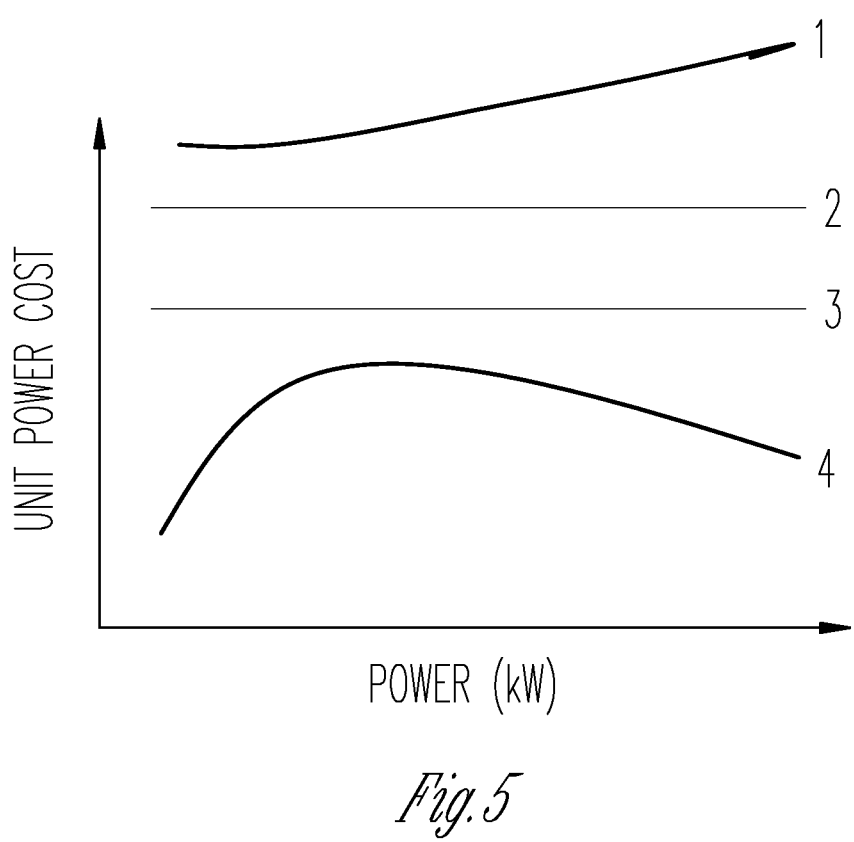
FIGS. 5-7 are graphs of unit power cost for energy assets of a microgrid system in accordance with this disclosure.

At block 410, a first set of one or more nonvarying candidate energy assets are identified by the microgrid controller. The nonvarying candidate energy assets are the energy assets of the microgrid system that have unit power costs (e.g., cost per unit power) that is not overlapping based on power distribution and does not vary in time. FIG. 5 is a graph of unit power cost versus power for four nonvarying candidate energy assets. The graph shows that the unit power cost of the energy assets is nonoverlapping as a function of power. In the example, the unit power cost of asset 1 is always higher than the unit power cost of asset 2, 2 is always higher than 3, and 3 is always higher than 4. The unit power cost of the energy assets does not change with time, or the future selected times of operating the grid. The relative ranking of these energy assets based on unit cost is clear, a-priori before the assets are brought online to the grid, regardless of time and power distribution among the energy assets, thus enabling a dispatch order of these energy assets based on lower unit cost.

At block 415, the microgrid controller applies one or more predetermined prioritization rules to prioritize the nonvarying candidate energy assets. The prioritization may include a pairwise comparison of the power cost functions of the nonvarying candidate energy assets, and the prioritization rules assign a higher priority for activation to the energy assets with a lower power cost function. For example, the nonvarying candidate energy assets may include a diesel-powered genset and a gas powered genset. Operating the diesel genset may always cost more than operating the gas genset (i.e., the diesel genset may always have a higher unit power cost than the gas genset. The microgrid controller would assign a higher priority to activating the gas genset based on a pairwise comparison of the per unit power cost functions of the diesel genset and the gas genset. In another example, a photovoltaic energy asset may always be less expensive than the gas genset in energy cost and emissions cost. The microgrid controller would assign a higher priority to activating the photovoltaic energy asset based on a pairwise comparison of the power cost functions of the photovoltaic energy asset and the gas genset.

Figure 6:
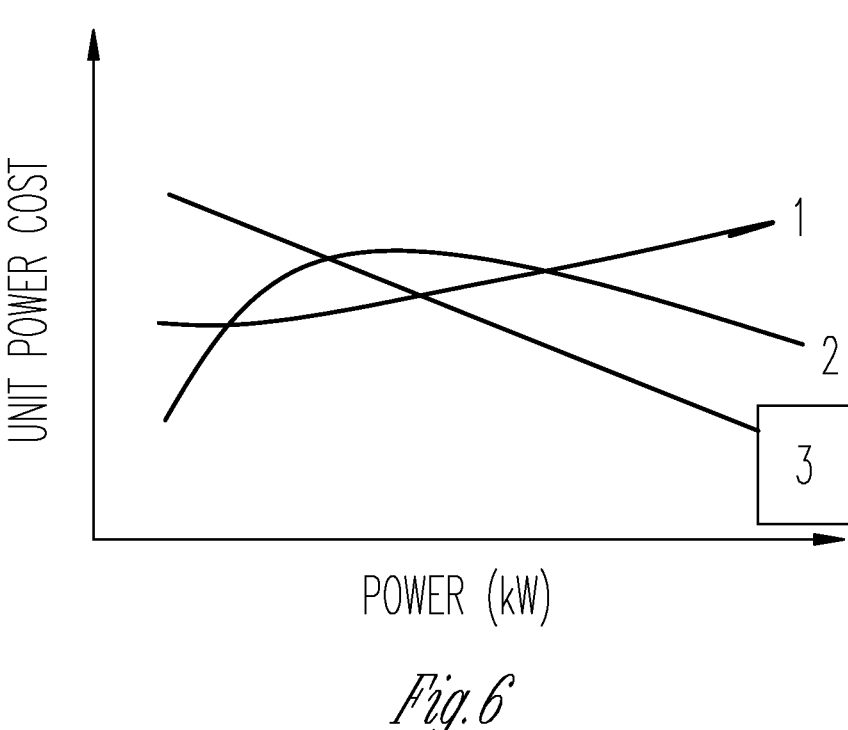

At block 420, the microgrid controller identifies a second set of multiple energy assets with unit power costs that do not vary in time but overlap based on power. FIG. 6 is a graph of unit power cost versus power for three candidate energy assets. The unit power costs vary with overlap of power distribution and not with time. The power cost functions intersect and are not clearly separable). However, the overlapping power distributions are known in advance and are time invariant. The microgrid controller may use optimized power distribution maps calculated with an optimizer a-priori to determine the power distribution for these candidate energy assets. Because the optimized power distribution maps can be conducted in advance, and not in real time, the real time task for the microgrid controller is mainly to use the a-priori maps for power distribution, and the computation burden on a real time optimizer is removed for these assets.

At block 425, the microgrid controller calculates a-priori, at least predominantly, the power cost and power distribution maps for the overlapping candidate assets (e.g., the power distribution maps for gensets as shown in FIG. 3). The microgrid controller can determine the power distribution maps for the overlapping candidate energy assets for a given power that the microgrid controller determined would be drawn from the overlapping candidate energy assets in real time. Additionally, the overall unit cost of the candidate assets as a function of overall total power on the candidate assets based on the power distribution maps may be calculated for use by the microgrid controller (e.g., for determining overall power between these assets versus others).

At block 430, the microgrid controller distributes power among overlapping candidate assets based on the a-priori power distribution maps and the total power to be dispatched from the overlapping candidate assets. When involving energy assets with identical cost maps (e.g., gensets of the same model), the choice of sequencing energy assets (e.g., the gensets in FIG. 3) may use maintenance hours or remaining life to prioritize the dispatch of power to ensure longer term balanced operation.

Figure 7:
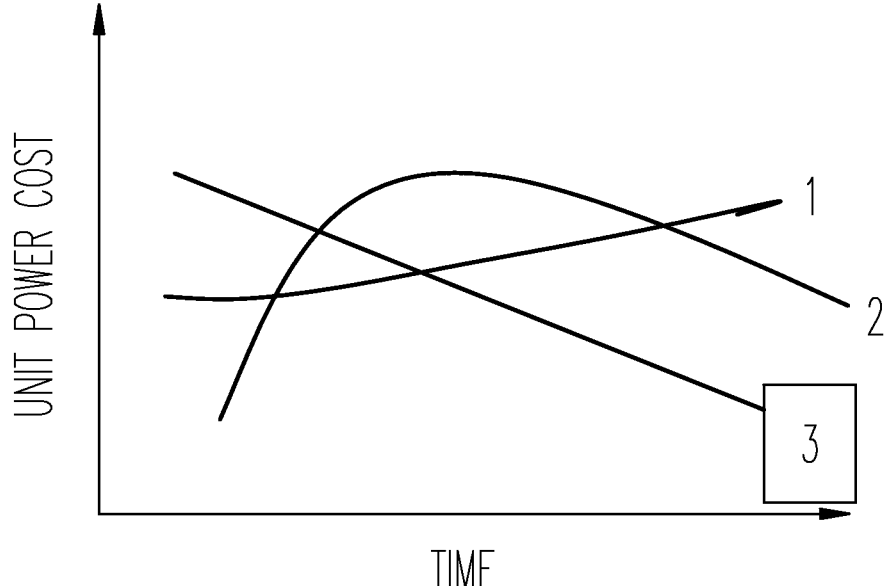

At block 435, the microgrid controller identifies a third set of one or more time-varying candidate energy assets. The time-varying candidate energy assets are the energy assets of the microgrid system that have a unit power cost that varies with time but does not vary with power distribution among multiple energy assets. FIG. 7 is a graph of unit power cost versus power for three candidate energy assets. The unit costs vary with time but are not varying with power. Because the relative unit power costs are clear at a given instant of time as they are independent of power, the dispatching of the energy assets can be prioritized in real time. The dispatch of the energy assets can be prioritized based on unit power cost, but the priority sequence is not fixed and is different at different times. The priority of dispatch is determined in real time, not a-priori, to account for the priority changes with time. At block 440, the microgrid controller calculates real time unit power cost for the time-varying candidate energy assets and prioritizes the third set of energy assets for dispatch. For example, utility prices for energy are time varying but, in some cases, per unit power cost may be cheaper than a local microgrid source at certain low demand times than other higher demand times, and thus the utility grid can be prioritized for import dispatch. In another example, the per unit power cost of an ESS unit is based on its state of charge and its charging and discharging history. The per unit power cost of the ESS unit is separable from the other energy assets into a priority of dispatch of power.

At block 445, the microgrid controller prioritizes dispatch of the time-varying candidate energy assets according to the calculated unit power cost and one or more predetermined prioritization rules. In some examples, the microgrid controller uses a pairwise comparison of the determined power cost functions of the time-varying candidate energy assets to prioritize activation of the set of the time-varying candidate energy assets. In some examples, the microgrid controller uses a pairwise comparison of the determined power cost functions of the nonvarying candidate energy assets, the overlapping candidate energy assets, and the time-varying candidate energy assets to prioritize activation of the nonvarying, overlapping, and time-varying candidate energy assets.

At block 450, the microgrid controller identifies a fourth set of one or more variable candidate energy assets. The variable candidate energy assets are the energy assets of the microgrid system that have a power cost function that varies with time and power distribution among multiple energy assets in a way that does not allow a-priori prioritization or optimization. Instead, a real time optimization algorithm is executed to determine power distribution among such assets. At block 455, activation of the variable candidate energy assets is optimized. Because of the way the power functions of the fourth candidate energy assets vary, the variable candidate assets are not easily separable for prioritizing for activation using a rule-based algorithm. The power cost functions of the fourth candidate energy assets depend on history, time, and overlapping power distribution (e.g., genset start/stop frequency, ESS cyclic aging, etc.). The activation of the variable candidate energy assets will be optimized in real time with an optimizer algorithm of the microgrid controller. The optimizer algorithm may optimize the activation of the variable candidate energy assets based on power availability data, energy cost data, energy asset degradation cost, energy asset maintenance cost, and energy asset operation efficiency cost.

At block 460, the microgrid controller sets the power distribution among the variable candidate energy assets for the predetermined time window based on the real time optimization. In some examples, the microgrid controller uses a pairwise comparison of the determined power cost functions of the nonvarying candidate energy assets, the overlapping candidate energy assets, the time-varying candidate energy assets, and the variable candidate assets to prioritize activation of those candidate energy assets.

The categorization of the energy assets of the microgrid system reduces the optimization from all energy assets to only those energy assets having cot functions that are multidimensional. This reduces the complexity of the optimization portion of the supervising of the microgrid system.

Activation of the energy assets of the microgrid system happens according to the determined priority and according to operating constraints on the energy assets. The operating constraints may be programmed into the microgrid controller, and the energy assets are activated according to the determined priority of activation and the operating constraints. Some examples of constraints include that the Net Power (both active and reactive power) provided by the activated energy assets matches the power needed by the load. The power that each asset (or group of assets if activated as a group) provides is less than or equal to the asset or group's operating maximum output (e.g., both active and reactive power limits, kilo-volt-ampere (kVA) rating limits, etc.). The power that each asset or group provides is greater than the operating minimum output. The operating minimum can be zero for some assets (e.g., gensets), but may be a finite minimum (e.g., for fuel cells). ESS energy assets may need a state of charge to be maintained between a minimum and maximum. Apart from these, there may be additional softer constraints (e.g., the desired minimum and desired maximum for energy assets) driven in some examples, by considerations of usable life for assets not accounted in cost functions. The microgrid may use a microgrid forming source, and the lowest cost microgrid forming source is activated first, and other non-grid forming energy assets are activated using the microgrid forming source as an anchor. There may also be resiliency and redundancy constraints imposed on the microgrid system as well to meet reliability goals.

FIG. 8 is a block diagram of an example computing device that can perform the functions of the microgrid controller as described herein. The computing device 800 may operate as a standalone device or may be connected (e.g., networked) to other machines. In a networked deployment, the computing device 800 may operate in the capacity of a server machine, a client machine, or both in server-client network environments. The computing device 800 may be a personal computer (PC), a tablet PC, a smartphone, an IoT device, or any machine capable of executing instructions (sequential or otherwise) that specify actions to be taken by that machine. Further, while only a single computing device is illustrated, the computing device may be multiple devices that individually or jointly execute a set (or multiple sets) of instructions to perform any one or more of the methodologies discussed herein, such as cloud computing, software as a service (Saas), other computer cluster configurations.

The computing device 800 may include a processing device 802 (e.g., a hardware processor, a central processing unit (CPU), a hardware processor core, application specific integrated circuit (ASIC), a programmable gate array (PGA), or any combination thereof, etc.) and a memory 804 (e.g., read-only memory (ROM), dynamic random-access memory (DRAM), static memory, etc.) that may communicate via a communication interface (e.g., a bus) 830. The processing device 802 can be configured to execute instructions 826 for performing the operations and steps discussed herein. The computer device 800 can further include a network interface device 808 to communicate over a network 820.

The computing device can include or have access to a computer-readable storage medium 818 on which is stored one or more sets of instructions 826 or software embodying any one or more of the methodologies or functions described herein. The instructions 826 can also reside, completely or at least partially, within the memory 804 or within the processing device 802 during execution thereof by the computer device 800, the main memory 804 and the processing device 802 also constituting computer-readable storage media.

The term "computer-readable storage medium" should be taken to include a single medium or multiple media that store the one or more sets of instructions (or any medium that can store or encode a set of instructions for execution by the computer device 800) that cause the computer device 800 to perform any one or more of the functions of the microgrid controller described herein. These media can include, among other things, solid-state memories, optical media, and magnetic media.

The computing device 800 may further include a display unit 806, an alphanumeric input device (e.g., a keyboard), and a user interface (UI) navigation device (e.g., a mouse). In an example, one or more of the display unit, the input device, or the UI navigation device may be a touch screen display.

The instructions 824 may further be transmitted or received over the network 820 using a transmission medium via the network interface device 808 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 808 may include one or more physical jacks (e.g., Ethernet, coaxial, or phone jacks) or one or more antennas to connect to the network 820. In an example, the network interface device 808 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium capable of storing, encoding, or carrying instructions for execution by the computing device 800, and includes digital or analog communications signals or other intangible medium to facilitate communication of software or firmware.

INDUSTRIAL APPLICABILITY

FIGS. 6A-6C is an illustration of an example of prioritized dispatch and constraints of energy assets of a microgrid system (e.g., the microgrid system 100 of FIG. 1). The microgrid controller is configured (e.g., by programming) to operate the energy assets within constraints on the operation of the microgrid system and activate the energy assets of the microgrid system according to the determined priority when possible (e.g., determined using the method of FIGS. 4A,4B) and the constraints.

Figure 9C:
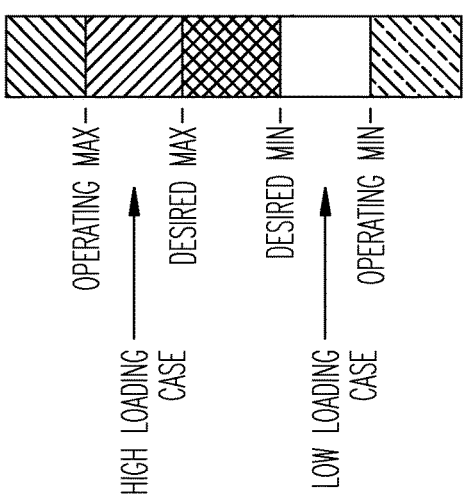
FIGS. 9A-9C illustrate an example of activation of energy assets of a microgrid system in accordance with this disclosure.
Figure 9B:
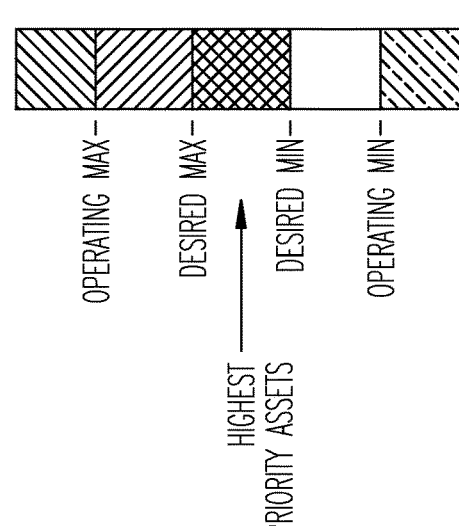
Figure 9A:
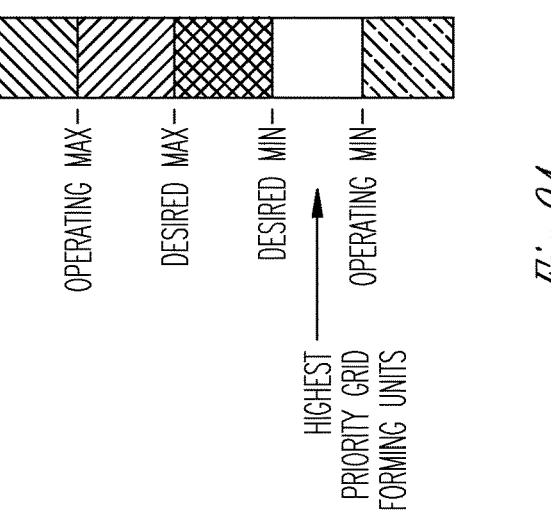

FIGS. 9A-9C show four operating constraints and five regions of operation of the energy assets of the microgrid system. The four operating constraints are the operating minimum output, the desired minimum output, the desired maximum output and the operating maximum output. The energy assets of the microgrid system have to operate out of the region above the operating maximum and out of the region below the operating minimum, and hence these are hard constraints. It is desirable operates energy assets of the microgrid system asset between the desired minimum and desired maximum, and hence these are soft constraints.

FIG. 9A illustrates the constraint need of activation of at least one grid forming energy asset. If priority of dispatch of the energy assets is determined using method in the example of FIGS. 4A-4B, the highest priority grid forming source is chosen to be activated and loaded to the desired minimum output load first, or at least above the operating minimum output load. If priorities cannot be determined, the operating constraints may be provided to a system optimizer for optimal selection and power distribution, either a-priori if possible, or in real time if necessary. Two microgrid forming capable sources may be activated if desired for system resiliency. When priorities for dispatch can be determined, the next available highest priority microgrid forming capable energy asset or group is activated. When priorities for dispatch cannot be determined, the constraints of requiring at least two grid forming sources to be activated and operating with load above the desired operating minimum, or least the operating minimum, are provided to the optimizer for optimal selection and power distribution, either a-priori if possible, or in real time if necessary.

FIG. 9B illustrates the desired operating region for energy assets between desired minimum and desired maximum for those assets prioritized for activation and power dispatch, whether they are grid forming or not. If priorities of dispatch can be determined (e.g., using the method of the example of FIGS. 4A-4B), the activation brings the determined highest priority assets of the microgrid system above the desired minimum output and below the desired maximum output. If the currently activated energy assets reach the desired maximum, the next highest priority energy asset is activated. Energy assets are activated according to priority whenever the currently operating energy assets reach the desired maximum output load, or if the load plus a reserve goes above the operating maximum. The next priority asset(s) are activated and brought into the region above operating minimum first, reducing the load below desired maximum for the higher priority if necessary. As load increases beyond desired minimum of next priority assets, the load is maintained at desired maximum for the highest priority assets, and between desired minimum and maximum of next highest priority assets. When load increases beyond desired maximum of next highest priority assets, lower priority assets are activated, and so on. Conversely, an energy asset is inactivated or dropped when the output load of the system drops below the desired minimum output load, and the drop maintains load and any reserve desired. When priorities cannot be determined, a power distribution optimizer, the a priori optimization uses desired minimum and desired maximum as soft constraints, and operating minimum and operating maximum as hard constraints. The optimization is a-priori if possible or real time, if necessary, as in the method of FIGS. 4A-4B.

FIG. 9C illustrates the operating scenarios for the high loading case when the microgrid system output goes above the desired maximum of priority assets and a low loading case when the microgrid system output goes above the desired minimum of priority assets. For the high loading case, next priority assets are added where possible as described earlier. If not, the assets are allowed to operate between desired maximum and operating maximum. Similarly, for the low loading case, lowest priority online assets are dropped where possible as described earlier. If not, the assets are allowed to operate between operating minimum and desired minimum. In case priorities cannot be determined, optimizer is able to allow operation below desired minimum or above desired maximum, as they are provided as soft constraints.

Unless explicitly excluded, the use of the singular to describe a component, structure, or operation does not exclude the use of plural such components, structures, or operations or their equivalents. The use of the terms "a" and "an" and "the" and "at least one" or the term "one or more," and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B" or one or more of A and B") is to be construed to mean one item selected from the listed items (A or B) or any combination of two or more of the listed items (A and B; A, A and B; A, B and B), unless otherwise indicated herein or clearly contradicted by context. Similarly, as used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

The above detailed description is intended to be illustrative, and not restrictive. The scope of the disclosure should, therefore, be determined with references to the appended claims, along with the full scope of equivalents to which such claims are entitled.

What is claimed is:

1. A method of controlling a microgrid system that includes different types of energy assets, the method comprising:

computing, by the microgrid system, real time power demand on the microgrid system;

selecting candidate energy assets of the microgrid system to activate according to the computed real time power demand;

dispatching candidate energy assets according to lower unit power cost when the candidate energy assets have unit power cost that does not vary with overlapping power distribution among energy assets of a same type regardless of whether the unit power cost varies with time;

dispatching candidate energy assets according to an a-priori determined optimization of power distribution when the candidate energy assets have unit power cost that varies with the overlapping power distribution and does not vary with time; and dispatching candidate energy assets according to real time optimization of power distribution when the candidate energy assets have unit power cost that varies with the overlapping power and varies with time.

2. The method of claim 1, wherein the dispatching candidate energy assets according to lower unit power cost includes prioritizing dispatch of the candidate energy assets using a rule-based prioritization algorithm and the unit power costs of the energy assets and any operational constraints of the candidate energy assets; and wherein the dispatching candidate energy assets according to the a-priori determined optimization of power distribution includes determining an order of dispatch of the candidate energy that optimizes the unit power cost of the candidate energy assets.

3. The method of claim 1, including:

identifying nonvarying candidate energy assets of the microgrid system having unit power cost that does not vary with the overlapping power distribution and does not vary with time; and determining the a-priori dispatch by setting a priority of dispatch of the nonvarying candidate energy assets according to lower unit power cost of the nonvarying candidate energy assets.

4. The method of claim 3, wherein the setting the priority of activation includes:

performing one or more pairwise comparisons of unit power cost of the nonvarying candidate energy assets; and setting the priority of activation according to the one or more pairwise comparisons.

5. The method of claim 1, including:

identifying overlapping candidate energy assets of the microgrid system having the unit power cost that varies with the overlapping power distribution and does not vary with time;

calculating a power distribution map for the overlapping candidate energy assets;

calculating overall power cost of the overlapping candidate energy assets using the calculated power distribution map; and determining the a-priori optimization by setting a priority of dispatch of the overlapping candidate energy assets according to the calculated overall power cost and the calculated power distribution map.

6. The method of claim 1, including:

identifying time-varying candidate energy assets of the microgrid system having unit power cost that does not varies with the overlapping power distribution and varies in time;

calculating, in real time, unit power cost for the time-varying candidate energy assets; and setting a priority of dispatching of the time-varying candidate energy assets in real time according to the unit power cost calculated in real time.

7. The method of claim 1, including:

identifying variable candidate energy assets of the microgrid system having the unit power cost that varies with the overlapping power distribution and varies in time; and optimizing, in real time, power distribution of the variable candidate energy assets and overall power cost of the variable candidate energy assets.

8. The method of claim 7, wherein the optimizing the power distribution of the varying candidate energy assets includes optimizing the overall power cost of the variable candidate energy assets according to power availability data, energy cost data, asset degradation cost, asset maintenance cost, and asset operation efficiency cost.

9. A microgrid controller of a microgrid system having multiple types of energy assets, the microgrid controller comprising:

processing circuitry configured to:

calculate real time power demand on the microgrid system;

identify candidate energy assets of the microgrid system to activate according to the calculated real time power demand;

dispatch candidate energy assets according to an a-priori determined dispatch when the candidate energy assets have unit power cost that does not vary with overlapping power distribution among energy assets of a same type regardless of whether the unit power cost varies with time;

dispatch candidate energy assets according to an a-priori determined optimization of power distribution when the candidate energy assets have unit power cost that varies with overlapping power distribution among multiple energy assets and does not vary with time; and dispatch candidate energy assets according to real time optimization of power distribution when the candidate energy assets have unit power cost that varies with overlapping power distribution among multiple energy assets and varies with time.

10. The microgrid controller of claim 9, wherein the processing circuitry is configured to:

identify nonvarying candidate energy assets of the microgrid system having unit power cost that does not vary with overlapping power distribution and does not vary with time;

compare the unit power cost of the nonvarying candidate energy assets; and set a priority of dispatch of the nonvarying candidate energy assets according to lower unit power cost of the nonvarying candidate energy assets.

11. The microgrid controller of claim 9, wherein the processing circuitry is configured to:

identify overlapping candidate energy assets of the energy microgrid system having the unit power cost that varies with the overlapping power distribution and does not vary with time;

calculate a power distribution map for the overlapping candidate energy assets;

calculate overall power cost of the overlapping candidate energy assets using the calculated power distribution map; and set a priority of dispatch of the overlapping candidate energy assets according to the calculated overall power cost and the calculated power distribution map.

12. The microgrid controller of claim 9, wherein the processing circuitry is configured to:

identify time-varying candidate energy assets of the energy microgrid system having the unit power cost that does not vary with the overlapping power distribution and varies in time;

calculate, in real time, unit power cost for the time-varying candidate energy assets; and set a priority of dispatch of the time-varying candidate energy assets according to the calculated unit power cost.

13. The microgrid controller of claim 9, wherein the processing circuitry is configured to:

identify variable candidate energy assets having the unit power cost that varies with overlapping power distribution and varies with time;

optimize, in real time, power distribution of the variable candidate energy assets and overall power cost of the variable candidate energy assets; and setting, according to optimized power cost, a priority of activation of the variable candidate energy assets.

14. The microgrid controller of claim 13, wherein the processing circuitry is configured to:

receive power availability data and energy cost data; and optimize power cost of the variable candidate energy assets using the power availability data, the energy cost data, an asset degradation cost, an asset maintenance cost, and an asset operation efficiency cost.

15. The microgrid controller of claim 9, wherein the processing circuitry is configured to:

identify first candidate energy assets having unit power cost that does not vary with overlapping power distribution among multiple assets and does not vary in time;

prioritize dispatch of the first candidate energy assets using a rule-based prioritization algorithm and the unit power costs of the energy assets and any operational constraints of the candidate energy assets;

calculate power distribution among second candidate energy assets not included in the first candidate energy assets and overall power cost of the second candidate energy assets; and prioritize dispatch of the second candidate energy assets to optimize power cost of the second candidate energy assets.

16. A microgrid system comprising:

multiple energy assets of different energy asset types, wherein the energy assets provide energy to the microgrid;

a microgrid controller including processing circuitry configured to:

determine system load information;

calculate real time power demand on the microgrid system using the system load information;

identify candidate energy assets of the microgrid system to dispatch according to the calculated real time power demand;

send a command to dispatch candidate energy assets according to an a-priori determined prioritization when the candidate energy assets have unit power cost that does not vary with overlapping power distribution among multiple energy assets regardless of whether the unit power cost varies with time;

send a command to dispatch candidate energy assets according to an a-priori determined optimization of power distribution when the candidate energy assets have unit power cost that varies with the overlapping power distribution and does not vary with time; and send a command to dispatch candidate energy assets according to real time optimization of power distribution when the candidate energy assets have unit power cost that varies with the overlapping power distribution and varies with time.

17. The microgrid system of claim 16, wherein the processing circuitry of the microgrid controller is configured to:

identify first candidate energy assets having a unit power cost function that does not vary with the overlapping power distribution and does not vary in time;

compare overall power cost function of the first candidate energy assets; and prioritize dispatch of the first candidate energy assets according to lower operating cost.

18. The microgrid system of claim 17, wherein the processing circuitry of the microgrid controller is configured to:

identify second candidate energy assets having the unit power cost that varies with the overlapping power distribution and does not vary with time;

calculate a power distribution map for the second candidate energy assets;

calculate overall power cost of the second candidate energy assets using the calculated power distribution map; and prioritize dispatch of the first and second candidate energy assets according to overall power cost of the first and second candidate energy assets.

19. The microgrid system of claim 18, wherein the processing circuitry of the microgrid controller is configured to:

identify third candidate energy assets having a unit power cost that does not vary with the overlapping power distribution and varies in time;

calculate overall power cost for the third candidate energy assets in real time; and prioritize dispatch of the first, second, and third candidate energy assets according to the overall power cost of the first, second, and third candidate energy assets.

20. The microgrid system of claim 16, wherein the processing circuitry of the microgrid controller is configured to:

identify variable candidate energy assets having the unit power cost that varies with the overlapping of power distribution and varies in time;

receive power availability data and energy cost data; and send commands to optimize dispatch of the variable candidate energy assets in real time using the load information, the power availability data, the energy cost data, an asset degradation cost, an asset maintenance cost, and an asset operation efficiency cost.

* * * * *